(12) United States Patent
Diggle, III et al.

(10) Patent No.: US 7,201,364 B2
(45) Date of Patent: Apr. 10, 2007

(54) RACEWAY LINE PULLER AND METHOD

(75) Inventors: Frederick James Diggle, III, Birmingham, AL (US); Jacob P. Jackson, Cullman, AL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 49 days.

(21) Appl. No.: 10/777,413

(22) Filed: Feb. 12, 2004

(65) Prior Publication Data

US 2005/0179015 A1 Aug. 18, 2005

(51) Int. Cl.
*B65H 59/00* (2006.01)
(52) U.S. Cl. .......................................... 254/134.3 FT
(58) Field of Classification Search ....... 254/134.3 FT, 254/134.7; 43/43.1, 43.12, 44.92; 294/82.1, 294/82.32, 87.1, 82.11
See application file for complete search history.

(56) References Cited

U.S. PATENT DOCUMENTS

| 1,689,170 | A | * | 10/1928 | Farmer | .................... | 294/82.11 |
| 3,330,533 | A | * | 7/1967 | Blume | ................ | 254/134.3 FT |
| 4,101,114 | A |   | 7/1978 | Martin et al. | | |
| 4,171,123 | A | * | 10/1979 | Woelkers | ............ | 254/134.3 FT |
| 5,517,785 | A | * | 5/1996 | Sawaf | .......................... | 43/9.9 |
| 6,098,250 | A |   | 8/2000 | Katz | | |
| 6,193,217 | B1 | * | 2/2001 | Zimmer | .............. | 254/134.3 FT |

OTHER PUBLICATIONS

New Tech Industries, Inc., "Fish Tape and Push Pull Rods", webpages, May 17, 2004, http://www.newtechindustries.com/newtech/access/page38d.htm.
TWAcomm.com, "Greenlee 30596—Junior Basket Type Pulling Grip", webpages, May 17, 2004, http://www.twacomm.com/Catalog/Model_30596.htm?SID=NRGND . . . .
U.S. Appl. No. 10/777,404, filed Feb. 12, 2004.
U.S. Appl. No. 10/777,919, filed Feb. 12, 2004.

* cited by examiner

*Primary Examiner*—Robert C. Watson
(74) *Attorney, Agent, or Firm*—Lee & Hayes, PLLC

(57) ABSTRACT

An apparatus for pulling line through a raceway includes a plurality of linked mounts and at least one attachment member. The at least one attachment member is attached to an end of the plurality of linked mounts and is adapted to releasably attach to an end of a fish tape. Further, the plurality of linked mounts is repositionable relative to one another.

15 Claims, 3 Drawing Sheets

RACEWAY LINE PULLER AND METHOD

BACKGROUND

The subject invention generally and in various embodiments relates to devices and methods for pulling one or more lines or wires, and more particularly to an apparatus and methods for pulling one or more lines or wires through raceways.

Electricians and/or technicians are often required to install a run of one or more lines or wires (e.g., electrical or communication wire) through lengths of raceways. Raceways may include conduits, ducts and other enclosed channels. A fish tape is commonly sent through the raceway for installing the run of lines or wires. Often, a first line or wire is folded about a tab at an end of the fish tape and taped to itself on the other side where it is doubled over. Then, if necessary, additional lines or wires are taped flush along the first line or wire. The fish tape is then pulled back out of the raceway with the lines or wires attached, with the intent to install the line or wire with the fish tape being removed. This places a tremendous amount of tension on the first line or wire where additional lines or wire are attached. Often the raceway will have angled bends (e.g., 90 degree bends, etc.) and may already have runs of line or wire inside the raceway. With this tension of the first line or wire carrying the additional lines or wires and the possible obstacles, the first line or wire may often pull away from the tab of the fish tape. Further, it is sometimes a challenge to circumvent the obstacles and deviations in the raceway without having lines or wires pull away from the first line or wire due to the lack of strength in the flush securing of the additional lines or wires to the first line or wire.

SUMMARY

Various embodiments of the present invention include an apparatus for pulling line through a raceway. The apparatus includes a plurality of linked mounts and at least one attachment member. The at least one attachment member is attached to an end of the plurality of linked mounts and is adapted to releasably attach to an end of a fish tape. Further, the plurality of linked mounts is repositionable relative to one another.

Various embodiments of the present invention also include a method for pulling line through a raceway. The method includes folding a line through a link of a chain and securing the folded line to itself. The method further includes attaching an attachment member of the chain to an end of a fish tape and pulling the fish tape through the raceway.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the present invention wherein like reference numerals are employed to designate like parts and wherein.

DETAILED DESCRIPTION

Figure 1:
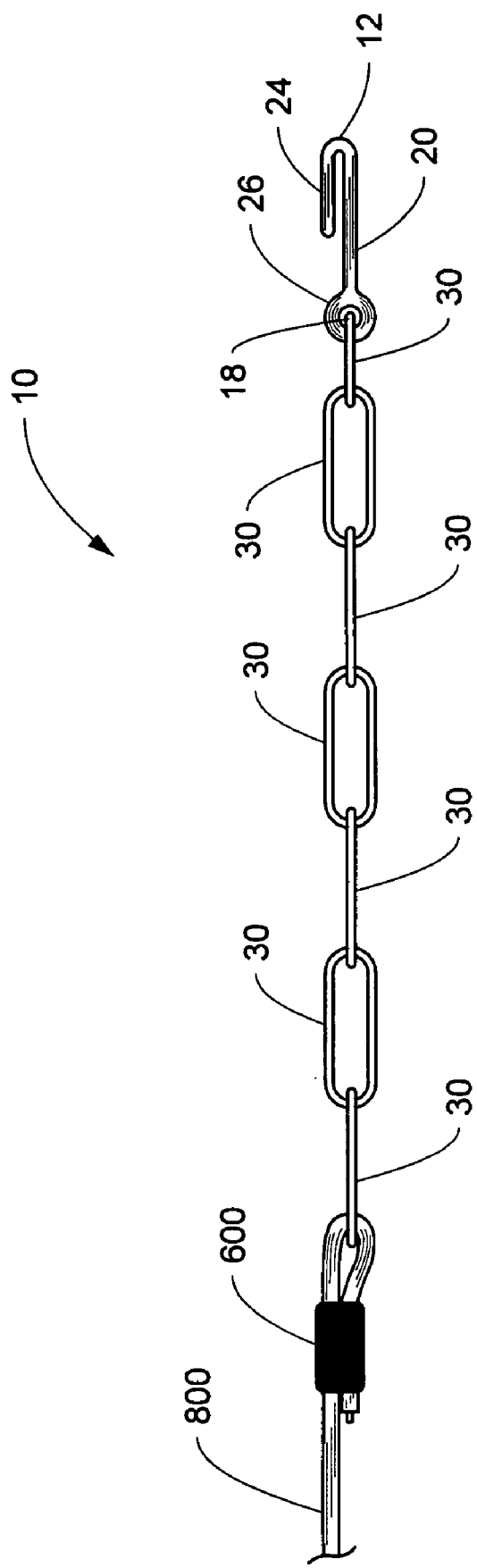
FIG. 1 is a side view of a line pulling apparatus according to various embodiments of the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

Figure 3:
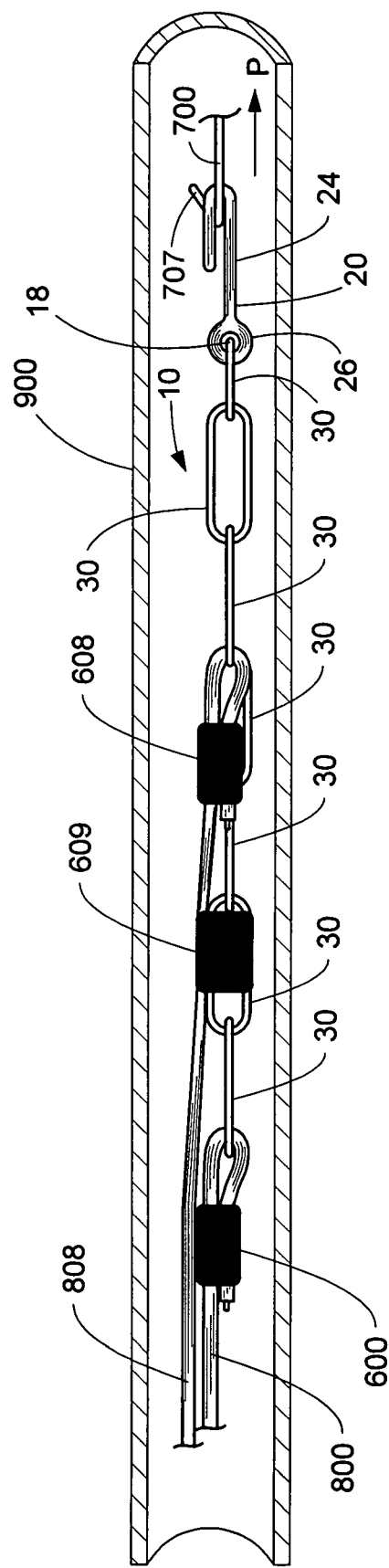
FIG. 3 is a side view of a line pulling apparatus in a raceway shown in cross-section according to various embodiments of the present invention.

FIGS. 1 and 3 depict various embodiments of a line puller 10 that generally can be used by a user, such as a technician (not shown) for example, to pull a line 800 through a raceway 900. Alternatively, more than one line 800 can be pulled. The raceway 900 may be, for example, a conduit, duct, enclosed channel, etc. The line puller 10 has an attachment member 20 and a plurality of linked mounts 30 attached to the attachment member 20. As can be seen in FIGS. 1 and 3, the line 800 is releasably secured to one linked mount 30 by tape 600. In this embodiment, the attachment member 20 is attached to an end 18 of the linked mounts 30 and is configured to fit within the raceway 900.

In various embodiments, the linked mounts 30 are connected by linking with adjacent linked mounts 30. Such a configuration allows the linked mounts 30 to reposition themselves individually. Thus, the linked mounts 30 are able to traverse a multitude of obstacles due to the linked mounts 30 being repositionable relative to one another within the raceway 900. See FIG. 3.

The linked mounts 30 have inner dimensions sized to receive the line 800. This allows the line 800 to be releasably secured to one linked mount 30. The line 800 may be releasably secured to one linked mount 30 by folding the line 800 through one linked mount 30 and then securing the line 800 to itself with tape 600 as shown in FIGS. 1 and 3. In addition, as shown in FIG. 3, the linked mounts 30 have dimensions that allow the linked mounts 30 to fit within the raceway 900. This is due to the linked mounts 30 having a width, or outer dimension, that is capable of being positioned within the raceway 900.

As illustrated, the attachment member 20 is a hook 24. The hook 24 has a loop 26 that is attached to the end 18 of the linked mounts 30. The loop 26 is constructed to fit within the raceway 900, as depicted in FIG. 3, and can be releasably secured to an end 707 of a fish tape 700 at an end 12 of the line puller 10. Thus, the attachment member 20 is adapted to releasably attach to the end 707 of the fish tape 700 for pulling the line 800 through the raceway 900.

In various embodiments, the line 800 is releasably secured to the linked mount 30. The line 800 is positioned through the linked mount 30 and releasably secured to the linked mount 30 for pulling through the raceway 900. See FIG. 3. As shown, the line 800 is releasably secured to one linked mount 30 by tape 600. However, other ways of releasably securing the line 800 may be used such as, for example, rubber bands, clips, etc. Alternatively, more than one linked mount 30 can have one line 800 releasably secured to that linked mount 30 as illustrated in FIG. 3.

As shown, the nature of the interconnection between the plurality of linked mounts 30 allows the weight of each line 800 attached to the line puller 10 to be transferred through the linked mounts 30 directly to the fish tape 700. Thus, no one line 800 is additionally burdened with additional weight from additional lines 800 being attached. See FIG. 3. The plurality of linked mounts 30 may thus be constructed from different materials having a sufficient tensile strength to carry multiple lines 800 such as, for example, metals, polymeric materials, etc. Thus, the line puller 10 generally is formed from material that is capable of carrying multiple lines 800.

The configuration of the attachment member 20 provides for attachment to the linked mounts 30. This provides the linked mounts 30 to be securely fastened to the attachment member 20 as the line puller 10 is employed. See FIG. 3. However, the attachment member 20 may also be releasably attached to the linked supports 30. Such a releasable attachment may be accomplished by using, for example, a scissor hook, releasable clasp, etc.

Figure 2:
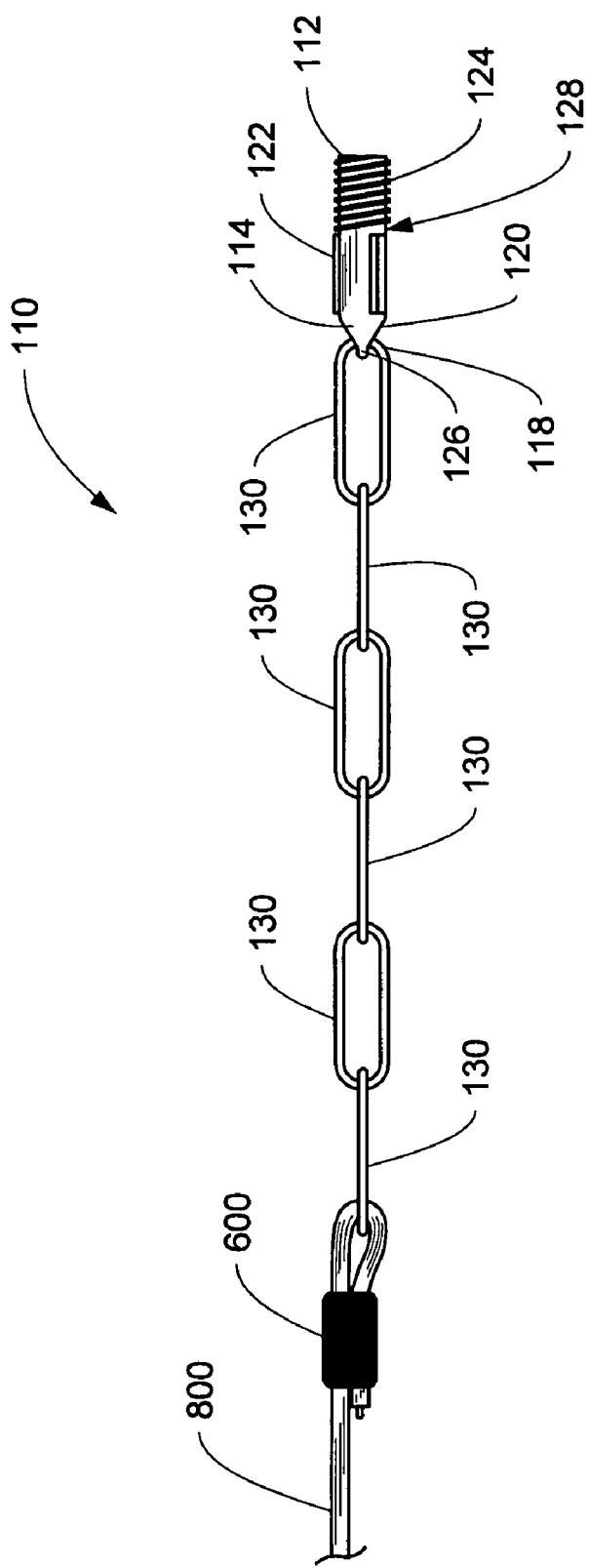
FIG. 2 is a side view of a line pulling apparatus according to various embodiments of the present invention.

FIG. 2 illustrates a line puller 110 for pulling line 800 having a threaded connector 120 and a plurality of linked mounts 130 attached to the threaded connector 120. The line puller 110 is provided for pulling the line 800 through a raceway (not shown) in a similar manner to that illustrated in FIG. 3 in connection with the line puller 10. Alternatively, more than one line 800 can be pulled. As shown, the threaded connector 120 is attached to an end 118 of the linked mounts 130 and is adapted to be releasably attached to an end of a female threaded fish tape (not shown).

In various embodiments, the linked mounts 130 are repositionable relative to one another and are connected by linking with adjacent linked mounts 130. Such a configuration allows the linked mounts 130 to reposition themselves individually, enabling the linked mounts 130 to traverse a multitude of obstacles within a raceway (not shown).

As shown in FIG. 2, the linked mounts 130 also have inner dimensions sized to receive the line 800. This allows the line 800 to be releasably secured to one linked mount 130. The line 800 can be releasably secured to one linked mount 130 by folding the line 800 through one linked mount 130. The line 800 is then secured to itself with tape 600. More than one line 800 can be attached to the line puller 110.

The threaded connector 120 has grips 122, threads 124 and a loop 126. The loop 126 is attached to the linked mounts 130 at an attachment end 114 of the line puller 110. Further, the threaded connector 120 is constructed to fit within a raceway (not shown) and can be releasably secured to the end of any female threaded fish tape (not shown) having matching threads. Thus, the threaded connector 120 is adapted to releasably attach to the end of the female threaded fish tape for pulling the line 800 through the raceway.

As can be seen in the drawings, the threads 124 are positioned at an end 112 of the threaded connector 120 for connecting with the end of the female threaded fish tape (not shown). Further, the grips 122 are positioned on an outer surface 128 of the line puller 110 and fit within the raceway (not shown). The grips 122 assist the technician (not shown) in twisting the threaded connector 120 into the end of the female threaded fish tape. In addition, the grips 122 are positioned longitudinally along the length of the threaded connector 120 on the outer surface 128 to further assist in attachment to the fish tape.

In various embodiments, the line 800 is releasably secured to the linked mount 130. The line 800 is positioned through the linked mount 130 and releasably secured to the linked mount 130 for pulling through a raceway (not shown) in a similar manner to that illustrated in FIG. 3 in connection with the line puller 10. As shown, the line 800 is releasably secured to one linked mount 130 by tape 600. However, other ways to releasably secure the line 800 may be used such as, for example, rubber bands, clips, etc. Alternatively, more than one linked mount 130 can have one line 800 releasably secured to that linked mount 130.

FIG. 2 shows the nature of the interconnection between the plurality of linked mounts 130. The interlinking of the linked mounts 130 allows the force applied by each line 800 attached to the line puller 110 to be transferred through the linked mounts 130 directly to the female threaded fish tape (not shown). Thus, no one line 800 is additionally loaded with weight from additional lines 800 that may be attached. The plurality of linked mounts 130 may thus be constructed from different materials having a sufficient tensile strength to carry multiple lines 800 such as, for example, metals, polymeric materials, etc. Thus, the line puller 110 generally is formed from a material that is capable of carrying multiple lines 800.

The threaded connector 120 is configured for attachment to the linked mounts 130 at the end 118. This provides the linked mounts 130 with a secure fastened arrangement to the threaded connector 120 as the line puller 110 is employed. However, the threaded connector 120 may also be releasably attached to the linked supports 130. Such a releasable attachment may be accomplished by using, for example, a scissor hook, releasable clasp, etc.

FIG. 3 illustrates the line puller 10 in the raceway 900 as it is pulled in the direction P. As shown, the line puller 10 has the line 800 releasably attached to a linked mount 30 and has a second line 808 attached to separate linked mounts 30. The line 800 is releasably attached to the line puller 10 by folding the line 800 through one of the linked mounts 30. Then the line 800 can be secured to itself by tape 600. The second line 808 can also be attached to another linked mount 30 in a similar fashion being secured by tape 608. Further, line 808 is additionally secured by tape 609 to another linked mount 30 other than the linked mount 30 that the line 808 is folded through and secured to. The line puller 10 is releasably attached to the end 707 of the fish tape 700 so that the line puller 10 can pull the lines 800, 808.

Although the line pullers have had one attachment member, multiple attachment members may be attached to the line pullers. One example of such a line puller would have a hook at one end and a threaded connector at the opposite end. The attachment members may also be releasably attached to the plurality of linked mounts to allow for reconfiguration of the attachment members. Thus the line puller may be reconfigured to have differing attachment members on the ends of the line pullers to enhance the versatility of the line puller.

FIGS. 1–3 depict the line pullers as generally ring-shaped. As well, in one embodiment the raceway is cylindrical. The line pullers may be configured in a variety of shapes such that the line pullers are capable of passing through the raceway for which that line puller is shaped to fit within. Other shapes and configurations of raceways may include, but are not limited to ducts, enclosed channels, etc.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus comprising:
   a line comprising at least one of an electrical wire and a communication wire;
   a plurality of linked mounts repositionable relative to one another with an inner dimension sized to receive the line, the line being coupled to the plurality of linked mounts; and
   at least one attachment member attached to an end of the plurality of linked mounts and adapted to releasably attach to an end of a fish tape,
   wherein the at least one attachment member comprises a threaded connector having threads positioned at an end of the threaded connector and a loop at an attachment end attached to the plurality of linked mounts.

2. The apparatus of claim 1, wherein the at least one attachment member releasably attaches to the plurality of linked mounts.

3. The apparatus of claim 1, wherein the threaded connector has grips positioned about an outer surface of the threaded connector.

4. The apparatus of claim 3, wherein the grips are positioned longitudinally along the outer surface of the threaded connector.

5. The apparatus of claim 1, wherein at least one linked mount of the plurality of linked mounts has the line positioned therethrough and releasably secured thereto.

6. The apparatus of claim 5, wherein the line is releasably secured to the at least one linked mount with tape.

7. The apparatus of claim 1, wherein the plurality of linked mounts has an outer dimension sized to fit within a raceway.

8. The apparatus of claim 7, wherein the at least one attachment member is sized to fit within a raceway.

9. The apparatus of claim 1, wherein the at least one attachment member is attached to a first end of the plurality of linked mounts and adapted to releasably attach to an end of a fish tape, and further comprising at least one other attachment member being attached to a second end of the plurality of linked mounts opposite the first end.

10. The apparatus of claim 9, wherein at least one other of the attachment members comprises a hook having a loop attached to the end of the plurality of linked mounts.

11. The apparatus of claim 10, wherein the line is coupled to at least one linked mount of the plurality of linked mounts, the line being folded through the linked mount and the line being secured to itself by tape.

12. The apparatus of claim 10, further comprising at least two lines, each line being coupled to a different one of the plurality of linked mounts, the lines being folded through the respective linked mount and each line being secured to itself by tape.

13. The apparatus of claim 9, wherein the plurality of linked mounts has an outer dimension sized to fit within a raceway.

14. The apparatus of claim 9, wherein the attachment members are sized to fit within a raceway.

15. An apparatus comprising:
   a line comprising at least one of an electrical wire and a communication wire;
   a plurality of linked mounts repositionable relative to one another with an inner dimension sized to receive the line and an outer dimension sized to fit within a raceway, wherein at least one linked mount of the plurality of linked mounts has the line positioned therethrough and releasably coupled thereto with tape; and
   at least one attachment member releasably attached to an end of the plurality of linked mounts and adapted to releasably attach to an end of a fish tape and to fit within the raceway,
   wherein the at least one attachment member comprises a threaded connector having threads positioned at an end of the threaded connector, a loop at an attachment end attached to the plurality of linked mounts, and grips positioned about an outer surface of the threaded connector and extending longitudinally along a length of the outer surface of the threaded connector.

* * * * *